United States Patent
Hillebrandt et al.

(10) Patent No.: US 9,911,528 B2
(45) Date of Patent: Mar. 6, 2018

(54) WIND TURBINE TRANSFORMER

(71) Applicant: VESTAS WIND SYSTEMS A/S, Aarhus N (DK)

(72) Inventors: Jesper Hillebrandt, Ringköbing (DK); Frank Schalow, Westminster, CO (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 104 days.

(21) Appl. No.: 14/352,495

(22) PCT Filed: Oct. 26, 2012

(86) PCT No.: PCT/DK2012/050396
§ 371 (c)(1),
(2) Date: Apr. 17, 2014

(87) PCT Pub. No.: WO2013/060337
PCT Pub. Date: May 2, 2013

(65) Prior Publication Data
US 2014/0252775 A1  Sep. 11, 2014

Related U.S. Application Data

(60) Provisional application No. 61/552,892, filed on Oct. 28, 2011.

(30) Foreign Application Priority Data

Dec. 20, 2011  (DK) ................................. 2011 70729

(51) Int. Cl.
| | | |
|---|---|---|
| H01F 27/12 | (2006.01) | |
| H01F 27/40 | (2006.01) | |
| H02K 7/18 | (2006.01) | |

(52) U.S. Cl.
CPC ........... *H01F 27/125* (2013.01); *H01F 27/40* (2013.01); *H02K 7/183* (2013.01)

(58) Field of Classification Search
CPC ........ H01F 27/125; H01F 27/10; H01F 27/16; H01F 27/18; H02K 7/183
(Continued)

(56) References Cited

U.S. PATENT DOCUMENTS 1,911,350 A * 5/1933 Clark .................... H01H 33/555
336/58
3,621,426 A * 11/1971 Bennon ................. H01F 27/002
174/18

(Continued)

FOREIGN PATENT DOCUMENTS

| CN | 2911908 Y | * | 6/2007 |
| CN | 202067652 U | * | 12/2011 |

(Continued)

OTHER PUBLICATIONS

Wind Turbine, 2001.*

(Continued)

*Primary Examiner* — Elvin G Enad
*Assistant Examiner* — Kazi Hossain
(74) *Attorney, Agent, or Firm* — Patterson + Sheridan, LLP

(57) ABSTRACT

A transformer assembly for a wind turbine is described. The transformer assembly includes a liquid-filled main transformer and an auxiliary transformer connected on the high-voltage side of the main transformer. The auxiliary transformer benefits from improved power quality in this configuration.

17 Claims, 1 Drawing Sheet

(58) Field of Classification Search
USPC .................... 336/58, 55, 57; 290/44, 55
See application file for complete search history.

(56) References Cited

U.S. PATENT DOCUMENTS

| | | | | | |
|---|---|---|---|---|---|
| 4,288,772 | A | * | 9/1981 | MacBeth | H01F 27/125 174/15.1 |
| 4,321,421 | A | * | 3/1982 | Pierce | H01F 27/18 174/11 R |
| 7,805,893 | B2 | * | 10/2010 | Scholte-Wassink | F03D 1/001 290/55 |
| 8,519,568 | B2 | * | 8/2013 | Langel | H02J 3/386 307/85 |
| 2005/0046196 | A1 | * | 3/2005 | Larsen | F03D 9/005 290/44 |
| 2007/0013193 | A1 | * | 1/2007 | Galloway | F03D 9/003 290/44 |
| 2008/0088131 | A1 | * | 4/2008 | Thisted | F03D 9/003 290/44 |
| 2009/0134625 | A1 | * | 5/2009 | Altenschulte | H01B 7/14 290/44 |
| 2009/0174265 | A1 | * | 7/2009 | Gozzi | H02J 9/005 307/131 |
| 2010/0084925 | A1 | | 4/2010 | Draper et al. | |
| 2011/0068576 | A1 | * | 3/2011 | Meier | H02P 9/04 290/7 |
| 2011/0140820 | A1 | * | 6/2011 | Guentert, III | H01F 27/12 336/58 |
| 2013/0015660 | A1 | * | 1/2013 | Hesselbæk | H02J 3/16 290/44 |

FOREIGN PATENT DOCUMENTS

| | | | |
|---|---|---|---|
| EP | 2151833 A1 | | 2/2010 |
| EP | 2166225 A1 | | 3/2010 |
| JP | 58100407 A | * | 6/1983 |
| JP | 581000407 | * | 6/1983 |

OTHER PUBLICATIONS

Wind farm , DM Energy.*
International Search Report for PCT/DK2012/050396, dated Jan. 7, 2013.
Danish Search Report for PA 2011 70729, dated Aug. 3, 2012.

* cited by examiner

WIND TURBINE TRANSFORMER

TECHNICAL FIELD

The present invention relates to liquid-filled transformers for wind turbines.

BACKGROUND

Wind power installations generally comprise one or more wind turbines connected to a grid or other such network. Typical installations comprise several wind turbines and are generally known as 'wind farms'. The wind turbines each comprise a rotor, which is mounted to a nacelle located at the top of a tower. The rotor has a plurality of blades, and is connected via a rotor shaft to a generator located inside the nacelle. The output of the generator is connected to a converter, which generally comprises a rectifier for converting the AC voltage output of the generator into a DC voltage, and an inverter for converting the DC voltage to an AC voltage having a frequency compatible with the grid frequency. The output from the converter is connected to a main transformer (also referred to as a high-voltage (HV) transformer) of the wind turbine, which converts the relatively low-voltage output from the generator into a high voltage suitable for transmission to the grid or to an intermediate substation supplying a power or utility grid.

Most modern wind turbines also include an auxiliary transformer (also referred to as a low-voltage (LV) transformer) that provides a source of low-voltage (typically about 120-400 V) AC power to the nacelle. This auxiliary transformer supplies a number of auxiliary components within the nacelle, such as lighting, which is required when maintenance personnel are working within the nacelle. The auxiliary transformer also provides a source of power to the pitch and yaw mechanisms, which allows these systems to be operated even when the turbine is not generating power. The auxiliary transformer is generally housed within the nacelle and is connected on the low-voltage side of the main transformer, taking its input from the converter output. An auxiliary transformer may also be associated with a substation, in which case the auxiliary transformer may supply a plurality of wind turbines.

SUMMARY OF INVENTION

In an embodiment, there is provided a transformer assembly for a wind turbine comprising a liquid-filled main transformer and an auxiliary transformer, wherein the auxiliary transformer is connected on the high-voltage side of the main transformer via a high-voltage connection.

BRIEF DESCRIPTION OF THE DRAWINGS

In order that the present invention may be more readily understood, embodiments of the invention will now be described by way of example only with reference to the following drawings, in which.

DESCRIPTION

Figure 1:
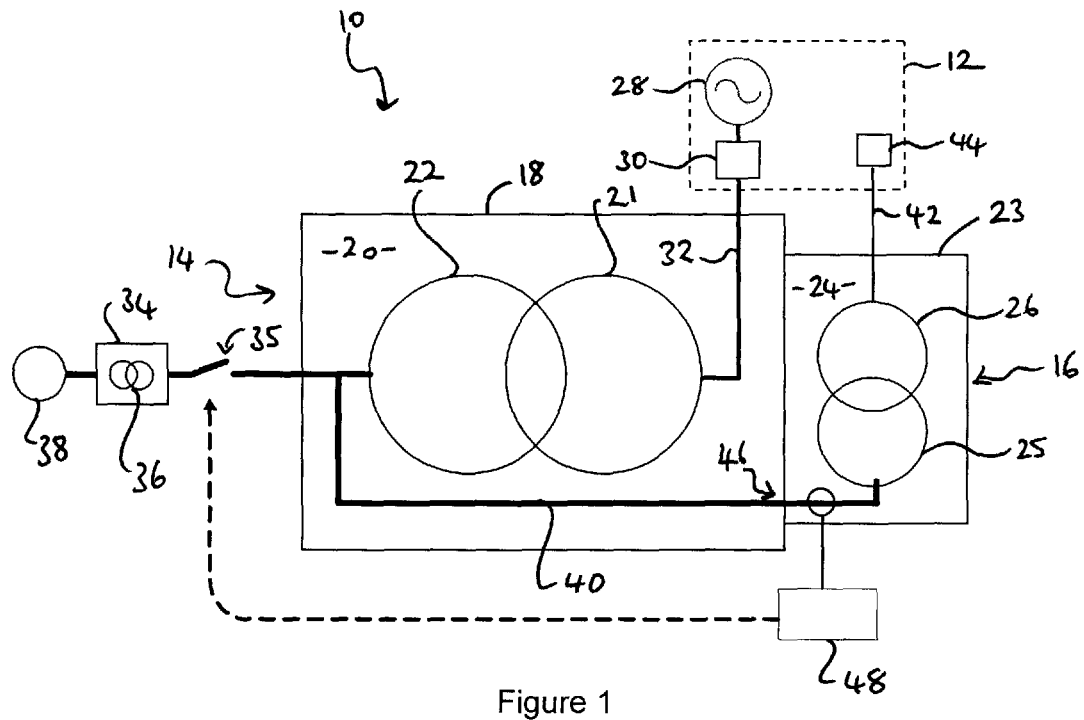
FIG. 1 is a schematic diagram of a transformer assembly according to a first embodiment of the present invention in which a main transformer and an integrated auxiliary transformer are provided in separate housings.

Before turning to the detailed description of the drawings, a few more general items of the invention will be discussed.

As indicated above, modern wind turbines comprise a main transformer for stepping up power generated by the wind turbine for providing to a power grid. Wind turbines also generally comprise an auxiliary transformer for supplying power to auxiliary functions in the turbine.

The current generation of utility-scale wind turbines typically have a maximum power rating of 2-5 megawatts (MW). The generators output a low voltage (LV) of about 0.66 to 1 kilovolt (kV), which is stepped-up to a voltage of about 10-33 kV by the main transformer. The LV output of the generator results in high currents, which means that expensive heavy-duty cabling is required between the generator and main transformer. Therefore, for economic and practical reasons, the main transformer is typically located inside the nacelle in order to minimise the length of cabling required. Currently, the main transformers used in most wind turbines are of the dry type.

It is becoming increasingly common to locate wind farms offshore. A typical offshore wind farm comprises an array of wind turbines that are connected to an offshore substation. The offshore substation converts the 10-33 kV collective output from the array of wind turbines to a high voltage (HV), typically about 132 kV, for transmission to an onshore connection point such as the grid.

Due to economies of scale, there is a drive to produce larger wind turbines capable of increasingly higher power output. The next generation of utility-scale wind turbines suitable for offshore use should have maximum power ratings in excess of 5 MW. Such wind turbines may employ a generator having a medium-voltage (MV) output of approximately 3 kV, which is connected to a power converter. The MV output from the generator results in a lower current output than the LV generators described above. This enables lighter cables to be used between the generator and the main transformer. It then becomes feasible to locate the main transformer outside the nacelle, at a down-tower location such as inside the tower or on a concrete base adjacent the tower, i.e. 'pad-mounted'.

Locating the main transformer outside the nacelle provides greater design freedom because the design of the transformer is not constrained by the restricted space inside the nacelle. Consequently, it is possible to use a larger main transformer capable of outputting a higher voltage. A main transformer is envisaged, which is capable of converting the 3 kV MV output to a HV output, typically in the range of 20-72.5 kV. Higher voltages are particularly desirable for offshore wind farms because it can allow the array of wind turbines to be connected directly to an on-shore substation, without the requirement for an expensive off-shore substation.

Dry-type transformers are not commercially available at high voltages such as 66 kV. It is therefore proposed to utilise a liquid-filled transformer, which are commercially available for producing these high voltages. A liquid-filled transformer comprises a sealed container, which is filled with an insulation liquid such as a mineral oil or synthetic fluid. The transformer windings are submerged in the fluid, which serves the dual-purpose of electrically insulating the live parts of the transformer and providing essential cooling of the transformer components, which become very hot in use.

High frequency switching of electrical switches within the power converter typically produces a high degree of harmonics on the MV side of the main transformer. This results in a poor quality power supply to the auxiliary transformer when the auxiliary transformer is connected in the traditional way described above, i.e. on the converter side of the main transformer.

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

A first aspect of the present invention provides a transformer assembly for a wind turbine comprising a liquid-filled main transformer and an auxiliary transformer, wherein the auxiliary transformer is connected on the high-voltage side of the main transformer via a high-voltage connection.

The main transformer is a step-up transformer, which is arranged to increase the voltage from a generator of the wind turbine to a higher voltage. The high-voltage output of the main transformer is typically supplied to a substation. The auxiliary transformer is arranged to supply relatively low-voltage components within the wind turbine. The auxiliary transformer is a step-down transformer, which is arranged to reduce the high-voltage output from the main transformer to a low voltage.

A primary winding of the auxiliary transformer is connected to a secondary, high-voltage winding of the main transformer. Hence, the auxiliary transformer takes its input from the high voltage output of the main transformer. The high-voltage side of the main transformer is commonly referred to as the 'grid-side'. Hence, in the present aspect, the auxiliary transformer is connected on the grid side of the main transformer.

The high-voltage main transformer provides significant filtering of the harmonics generated by the power converter. Consequently the power quality on the high-voltage side of the main transformer is higher than the power quality on the converter-side of the main transformer, i.e. the main transformer serves to improve the power quality. By connecting the auxiliary transformer on the high-voltage side of the main transformer, the auxiliary transformer receives higher quality power than it would were it connected on the converter side of the main transformer in accordance with typical prior art arrangements.

It will be appreciated that a larger, more expensive auxiliary transformer is required when the connection is on the HV side of the main transformer. This is because the auxiliary transformer must be able to provide a step-down from a high voltage (e.g. 66 kV) to a low voltage (e.g 400 V). In contrast, an auxiliary transformer connected on the converter side of the main transformer, as in the prior art arrangements, would only need to step-down from the medium voltage output of the generator, e.g. 3 kV. It may therefore seem counter-intuitive to provide the connection on the HV side of the main transformer in accordance with the present aspect. However, despite the increased cost of the auxiliary transformer, calculations have shown that the arrangement of the present aspect provides a significant cost saving over providing the connection on the 3 kV side because this would require additional expensive filtering equipment to eliminate the harmonics generated by the power converter.

Connecting the auxiliary transformer on the high-voltage side of the main transformer presents a significant challenge. For example, the high voltage connection (e.g. 66 kV) to the auxiliary transformer requires proper electrical insulation, and robust switchgear. These challenges are addressed by preferred configurations as described below.

In a particularly advantageous and preferred configuration, the HV connection between the main and auxiliary transformers is provided within the insulation liquid of the main transformer. For example, the connection may comprise a metallic conductor (e.g. copper cable) that extends inside the housing of the main transformer and hence through the insulation liquid of the main transformer. The insulation liquid of the main transformer thereby serves also to insulate the HV connection to the auxiliary transformer. This arrangement provides a convenient and inexpensive solution for insulating the high-voltage connection.

Preferably, the auxiliary transformer is integrated with the main transformer. Embodiments of the invention are envisaged in which the auxiliary transformer and the main transformer share a common housing. In this configuration, the main and auxiliary transformers may conveniently share the same insulation liquid. Alternatively, the auxiliary transformer and the main transformer may comprise separate housings. For example the auxiliary transformer housing may be bolted to, or otherwise connected to the main transformer housing. In such configurations, the insulation liquid of the main transformer may be kept separate from, or shared with, the auxiliary transformer. For example, pipes or channels may be provided between the two housings for communicating a common insulation liquid. Alternative arrangements are envisaged whereby the main and auxiliary housings are connected by a bushing, pipe or equivalent means within which the HV connection between the transformers is provided. The pipe may contain the insulation liquid of the main transformer although it will be appreciated that this is not essential within the scope of the present invention. The pipe may also communicate insulation liquid between the main and auxiliary transformers.

In preferred configurations, the auxiliary transformer shares the switchgear of the main transformer. This provides a further cost saving over prior art arrangements because an auxiliary transformer connected on the converter side of the main transformer would require its own switchgear. It is of course possible to provide the auxiliary transformer with its own, separate switchgear in an alternative configuration. However, this is prohibitively expensive at present.

In a second aspect of the invention, there is provided a wind turbine comprising a transformer assembly as described above. The transformer assembly is preferably provided at a down-tower location, for example inside the base of the tower or adjacent the tower, i.e. pad-mounted. The wind turbine preferably comprises a generator that outputs power at a medium voltage of between approximately 1-6 kV, and preferably about 3 kV. The main transformer preferably steps-up the voltage to a voltage of between approximately 20-72.5 kV, although it will be appreciated that higher voltages could be achieved depending upon the size and specification of the equipment. Preferred voltages at present are 33 and 66 kV.

In another aspect of the invention, there is provided a wind farm comprising at least one wind turbine as described above. The main transformer of the at least one wind turbine may be connected to a substation of the wind farm. The substation may include a high-voltage step-up transformer for increasing the voltage of the power supplied via the main transformer to a suitable level for supplying a grid or other network. Typically, the substation transformer may increase the voltage to about 132 kV or more. The wind farm may be located offshore or onshore. The substation may be located offshore or onshore. In preferred embodiments of the invention, the wind farm is located offshore whilst the substation is located on shore. This arrangement is particularly suitable for a 66 kV connection between the main transformer and the onshore substation.

Referring to FIG. 1, there is shown schematically a transformer assembly 10 for a wind turbine 12 in accordance with a first embodiment of the present invention. The transformer assembly 10 is suitably-sized to be located inside a wind turbine tower or pad-mounted adjacent the tower. The transformer assembly 10 comprises a liquid-filled main transformer 14 and an integrated auxiliary transformer 16. The main transformer 14 comprises a housing 18 in the form of a sealed container, which contains an insulation liquid 20. In this example, the insulation liquid 20 is a synthetic ester fluid. Primary and secondary windings 21, 22 of the main transformer 14 are located inside the liquid-filled container 18.

The integrated auxiliary transformer 16 comprises a separate housing 23, also in the form of a sealed container, which is mounted externally to the main transformer housing 18. The sealed container 23 is filled with a synthetic ester insulation liquid 24 and houses the primary and secondary windings 25, 26 of the auxiliary transformer 16.

In the present embodiment, a 3 kV AC generator 28 and power converter 30 are located inside the nacelle of the wind turbine 12, and are shown schematically in FIG. 1. The generator 28 is connected to the rotor of the wind turbine 12, generally via a gearbox, and generates electrical energy as the rotor is turned by the wind.

The converter output 32 is connected to the primary winding 21 of the main transformer 14, whilst the secondary winding 22 of the main transformer 14 is connected to a wind farm substation 34 via high-voltage switchgear 35. The main transformer 14 is a step-up transformer, which in this example has a turns ratio of 1:22 such that it converts the 3 kV input voltage at the primary winding 21 into a 66 kV output voltage at the secondary winding 22.

The wind farm substation 34 includes a step-up transformer 36, which in this example has a turns ratio of 1:2, and thus converts the 66 kV output voltage from the wind turbine main transformer 14 into a higher voltage of 132 kV for supplying to an electricity distribution grid 38. Whilst only a single wind turbine 12 is represented in FIG. 1, in practice the substation 34 would typically be connected to a plurality of wind turbines of the wind farm, with each wind turbine having a respective transformer 10 as shown in FIG. 1. In this example, the wind farm is located offshore, whilst the substation 34 is located on-shore. The high-voltage switchgear 35 allows the wind turbine 12 to be disconnected or reconnected from the grid 38 as required.

The auxiliary transformer 16 is configured to power auxiliary components within the wind turbine 12, such as lighting circuits and the pitch and yaw mechanisms. The primary winding 25 of the auxiliary transformer 16 is connected to the high-voltage (66 kV) output of the main transformer 14 via a high-voltage connection 40. The secondary winding 26 of the auxiliary transformer 14 is connected via a low-voltage connection 42 to an auxiliary circuit 44 within the wind turbine 12. The auxiliary circuit 44 supplies the auxiliary components of the wind turbine 12. The auxiliary transformer 16 is a step-down transformer having a turns ratio of 165:1 such that it converts the 66 kV high-voltage input into a 400 V low-voltage output for supply to the auxiliary circuit 44.

High frequency switching of electrical switches within the power converter 30 of the wind turbine 12 typically introduces harmonics into the 3 kV output from generator 28, resulting in a reduced power quality. The main transformer 14 effectively filters these harmonics, resulting in improved power quality on the high-voltage side of the main transformer 14. Connecting the auxiliary transformer 16 on the high-voltage side of the main transformer 14 as shown in FIG. 1 therefore enables the auxiliary transformer 16 to benefit from the improved power quality on this side of the main transformer 14.

The auxiliary transformer 16 is connected between the main transformer 14 and the high-voltage switchgear 35. In this configuration, the auxiliary transformer 16 is conveniently able to share the high-voltage switchgear 35 normally associated with the main transformer 14, which results in a significant cost saving because separate switchgear is then not needed for the auxiliary transformer 16.

The high-voltage connection 40 between the main transformer 14 and the auxiliary transformer 16 comprises a heavy-duty copper cable within an insulating sheath. The cable is located inside the sealed container 18 of the main transformer 14 and is submerged within the insulation liquid 20 of the main transformer 14. In this configuration, the insulation liquid 20 of the main transformer 14 electrically insulates the high-voltage connection 40 between the transformers 14, 16. The insulation liquid 20 also serves to dissipate heat from the high-voltage connection 40, which inevitably becomes hot in use.

The copper cable extends into the housing 23 of the auxiliary transformer 16 via a passage 46 defined by a bushing between the two housings 18, 23. The passage 46 is sealed to prevent the insulation liquid 20 of the main transformer 14 mixing with the insulation liquid 24 of the auxiliary transformer 16. However, in other embodiments of the invention, the main and auxiliary transformers 14, 16 may share the same insulation fluid, in which case the passage 46 may provide a communication path for fluid between the two containers 18, 23. Alternatively or additionally, fluid communication between the two containers 18, 23 may be provided by one or more further channels. The part of the copper cable within the auxiliary transformer housing 23 is submerged within the insulation liquid 24 of the auxiliary transformer 16, again for the purposes of electrical insulation and cooling.

A current monitoring unit 48 is configured to monitor current flow in the high-voltage connection 40 between the main and auxiliary transformers 14, 16. The monitoring unit 48 is configured to send a signal to the high-voltage switchgear 35 causing it to trip in the event that a short circuit current is detected in the high-voltage connection 40. A short circuit is detected if current flow through the high-voltage connection 40 exceeds a predetermined threshold level, for example 10-100 A.

Whilst not shown, current monitoring units are also associated with the main transformer 14. However, these current monitoring units are generally not suitable for monitoring short circuit currents in the high-voltage connection 40 to the auxiliary transformer 16 because the normal current flow associated with the main transformer 14 would exceed a short-circuit current level associated with the auxiliary transformer 16 and hence standard current monitoring devices of the main transformer 14 would not be able to distinguish between a fault of the integrated auxiliary transformer 16 and the normal operation of the main transformer 14.

Figure 2:
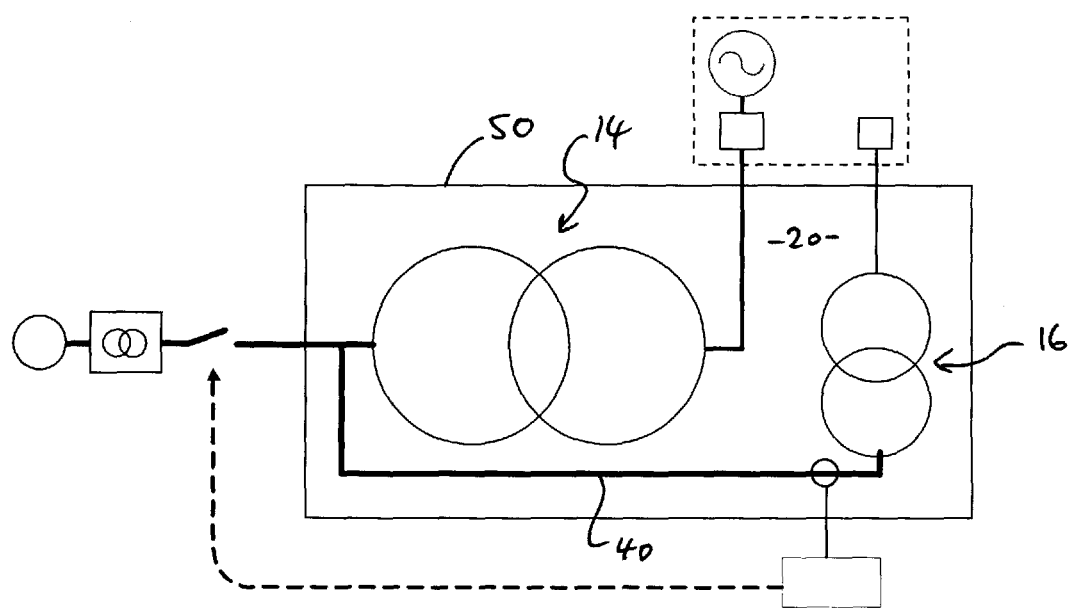
FIG. 2 shows an alternative embodiment of the present invention in which the main and auxiliary transformers are located in a common housing.

FIG. 2 shows an alternative embodiment of the present invention in which the integrated auxiliary transformer 16 and the main transformer 14 are located in a common liquid-filled container 50. In this embodiment, the main and auxiliary transformers 14, 16 share the same insulation liquid 20, and the high-voltage connection 40 between the transformers 14, 16 is located within that insulation liquid 20. The other features of this embodiment are the same as for the first embodiment described above.

In other examples of the invention, the main transformer 14 may be configured to output a voltage of 33 kV instead of 66 kV. In such cases, with all other factors being equal, the main transformer 14 would have a turns ratio of 1:11; the auxiliary transformer 16 would have a turns ratio of 165:2; and the transformer of the substation 34 would have a turns ratio of 1:4.

Many modifications may be made to the specific examples described above without departing from the scope of the present invention as defined in the following claims.

What is claimed is:

1. A transformer assembly for a wind turbine, the transformer assembly comprising:
   a housing with an insulation liquid disposed therein, wherein the housing is external to a nacelle of the wind turbine;
   a main transformer with windings submerged in the insulation liquid, wherein a low-voltage side of the main transformer is configured to connect with a power converter of the wind turbine;
   an auxiliary transformer with windings submerged in the insulation liquid, wherein a high-voltage side of the auxiliary transformer is connected with a high-voltage side of the main transformer via a high-voltage connection disposed within the housing, wherein a low-voltage side of the auxiliary transformer is configured to connect, via a low-voltage connection, with one or more auxiliary components disposed within the wind turbine; and
   a current monitoring unit coupled with the high-voltage connection and configured to transmit, using a measured current between the main transformer and the auxiliary transformer, a control signal to a common switchgear that is external to the housing,
   wherein a first terminal of the common switchgear is coupled to the main transformer and to the auxiliary transformer via the high-voltage connection, and wherein a second terminal of the common switchgear is coupled to a wind farm substation.

2. The transformer assembly of claim 1, wherein the high-voltage connection is at a voltage between 20-72.5 kilovolts (kV).

3. A wind turbine system comprising:
   a nacelle having a generator and a power converter disposed therein;
   a housing external to the nacelle and having an insulation liquid disposed therein;
   a main transformer with windings submerged in the insulation liquid, wherein a low-voltage side of the main transformer is connected with the power converter;
   an auxiliary transformer with windings submerged in the insulation liquid, wherein a high-voltage side of the auxiliary transformer is connected with a high-voltage side of the main transformer via a high-voltage connection disposed within the housing;
   one or more auxiliary components connected via a low-voltage connection with a low-voltage side of the auxiliary transformer; and
   a current monitoring unit coupled with the high-voltage connection and configured to transmit, using a measured current between the main transformer and the auxiliary transformer, a control signal to a common switchgear that is external to the housing,
   wherein a first terminal of the common switchgear is coupled to the main transformer and to the auxiliary transformer via the high-voltage connection, and wherein a second terminal of the common switchgear is coupled to a wind farm substation.

4. The wind turbine system of claim 3, wherein the main transformer and the auxiliary transformer are provided at a down-tower location.

5. A wind farm comprising:
   a substation coupled with an electrical grid;
   at least one wind turbine comprising:
      a generator disposed in a nacelle;
      a power converter disposed in the nacelle; and
      one or more auxiliary components;
   a transformer assembly external to the nacelle, the transformer assembly comprising:
      a housing having an insulation liquid disposed therein;
      a main transformer comprising windings submerged in the insulation liquid, wherein a low-voltage side of the main transformer is connected with the power converter; and
      an auxiliary transformer comprising windings submerged in the insulation liquid, wherein a high-voltage side of the auxiliary transformer is connected with a high-voltage side of the main transformer via a high-voltage connection disposed within the housing, and wherein a low-voltage side of the auxiliary transformer is connected with the one or more auxiliary components via a low-voltage connection;
   a common switchgear coupled between the substation and the high-voltage connection; and
   a current monitoring unit coupled with the high-voltage connection and configured to transmit, using a measured current between the main transformer and the auxiliary transformer, a control signal to the common switchgear.

6. The wind farm of claim 5, wherein the at least one wind turbine system is located off shore and the wind farm substation is located on shore.

7. The transformer assembly of claim 1, wherein a primary winding of the auxiliary transformer is connected to a secondary high-voltage winding of the main transformer.

8. The transformer assembly of claim 1, wherein the main transformer comprises a step-up transformer and the auxiliary transformer comprises a step-down transformer.

9. The transformer assembly of claim 2, wherein the auxiliary transformer reduces the voltage from 20-72.5 kilovolts (kV) to 120-400 volts.

10. The wind turbine system of claim 3, wherein the high-voltage connection is at a voltage between 20-72.5 kilovolts (kV).

11. The wind farm of claim 5, wherein the high-voltage connection is at a voltage between 20-72.5 kilovolts (kV).

12. The transformer assembly of claim 1, wherein the common switchgear is the only switchgear between the main transformer and the wind farm substation.

13. The wind turbine system of claim 3, wherein the common switchgear is the only switchgear between the main transformer and the wind farm substation.

14. The wind farm of claim 5, wherein the common switchgear of the at least one wind turbine is the only switchgear between the main transformer of the at least one wind turbine and the wind farm substation.

15. The transformer assembly of claim 1, wherein transmitting the control signal to the common switchgear comprises:
    detecting, using the measured current, a short circuit condition of the high-voltage connection; and
    transmitting the control signal that causes the common switchgear to trip.

16. The transformer assembly of claim 15, wherein the short circuit condition corresponds to the measured current exceeding a predetermined threshold current level, the predetermined threshold current level between about 10 amps (A) and about 100 A.

17. The wind turbine system of claim 3, wherein transmitting the control signal to the common switchgear comprises:
    detecting, using the measured current, a short circuit condition of the high-voltage connection; and
    transmitting the control signal that causes the common switchgear to trip.

* * * * *